United States Patent
Livshiz et al.

(10) Patent No.: US 8,594,904 B2
(45) Date of Patent: Nov. 26, 2013

(54) SYSTEM AND METHOD FOR SECURING ENGINE TORQUE REQUESTS

(75) Inventors: Michael Livshiz, Ann Arbor, MI (US); Jeffrey M. Kaiser, Highland, MI (US); Richard B. Jess, Haslett, MI (US); Michael J. Pitsch, Ann Arbor, MI (US); Michael L. Waterman, Royal Oak, MI (US); Pahngroc Oh, Ann Arbor, MI (US)

(73) Assignee: GM Global Technology Operations LLC

( * ) Notice: Subject to any disclaimer, the term of this patent is extended or adjusted under 35 U.S.C. 154(b) by 153 days.

(21) Appl. No.: 13/242,664

(22) Filed: Sep. 23, 2011

(65) Prior Publication Data

US 2013/0080023 A1 Mar. 28, 2013

(51) Int. Cl.
*G06F 19/00* (2011.01)
*F16H 61/48* (2006.01)

(52) U.S. Cl.
USPC .......................................................... 701/102

(58) Field of Classification Search
USPC ............ 123/399, 406.23–406.25, 436, 90.15; 701/110; 73/14.13, 114.24, 114.25
See application file for complete search history.

(56) References Cited

U.S. PATENT DOCUMENTS

| | | | |
|---|---|---|---|
| 6,371,081 B1 * | 4/2002 | Hawkins et al. | 123/352 |
| 6,701,246 B2 * | 3/2004 | Riedle et al. | 701/110 |
| 7,463,970 B2 * | 12/2008 | Livshiz et al. | 701/114 |
| 8,340,882 B2 * | 12/2012 | Kim | 701/90 |
| 2009/0118972 A1 * | 5/2009 | Baur et al. | 701/102 |
| 2011/0118955 A1 | 5/2011 | Livshiz et al. | |

OTHER PUBLICATIONS

U.S. Appl. No. 13/166,232, filed Jun. 22, 2011, Livshiz et al.

* cited by examiner

*Primary Examiner* — Stephen K Cronin
*Assistant Examiner* — Elizabeth Hadley

(57) ABSTRACT

A control system for an engine includes an engine torque request module, an engine torque response module, a torque command limit module, and an actuation module. The engine torque request module determines an engine torque request based on (i) an engine power request and (ii) a desired engine speed (DRPM). The engine torque response module determines first and second torque values based on (i) an engine torque response model and (ii) first and second torque boundaries, wherein the first and second torque boundaries are based on the DRPM and a measured engine speed (RPM). The torque command limit module generates a secured engine torque request based on (i) the engine torque request and (ii) the first and second torque values. The actuation module controls at least one actuator of the engine based on the secured engine torque request.

20 Claims, 4 Drawing Sheets

SYSTEM AND METHOD FOR SECURING ENGINE TORQUE REQUESTS

CROSS-REFERENCE TO RELATED APPLICATIONS

This application is related to commonly-assigned U.S. patent application Ser. No. 12/621,823, filed on Nov. 19, 2009 (U.S. Pub. No. 2011-0118955 A1), and commonly-assigned U.S. patent application Ser. No. 13/166,232, filed on Jun. 22, 2011. The disclosures of the above applications are incorporated herein by reference in their entirety.

FIELD

The present disclosure relates to internal combustion engines and more particularly to a system and a method for securing engine torque requests.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders, Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A control system for an engine includes an engine torque request module, an engine torque response module, a torque command limit module, and an actuation module. The engine torque request module determines an engine torque request based on (i) an engine power request and (ii) a desired engine speed (DRPM). The engine torque response module determines first and second torque values based on (i) an engine torque response model and (ii) first and second torque boundaries, wherein the first and second torque boundaries are based on the DRPM and a measured engine speed (RPM). The torque command limit module generates a secured engine torque request based on (i) the engine torque request and (ii) the first and second torque values. The actuation module controls at least one actuator of the engine based on the secured engine torque request.

A method for controlling an engine includes determining an engine torque request based on (i) an engine power request and (ii) a desired engine speed (DRPM), determining first and second torque values based on (i) an engine torque response model and (ii) first and second torque boundaries, wherein the first and second torque boundaries are based on the DRPM and a measured engine speed (RPM), generating a secured engine torque request based on (i) the engine torque request and (ii) the first and second torque values, and controlling at least one actuator of the engine based on the secured engine torque request.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
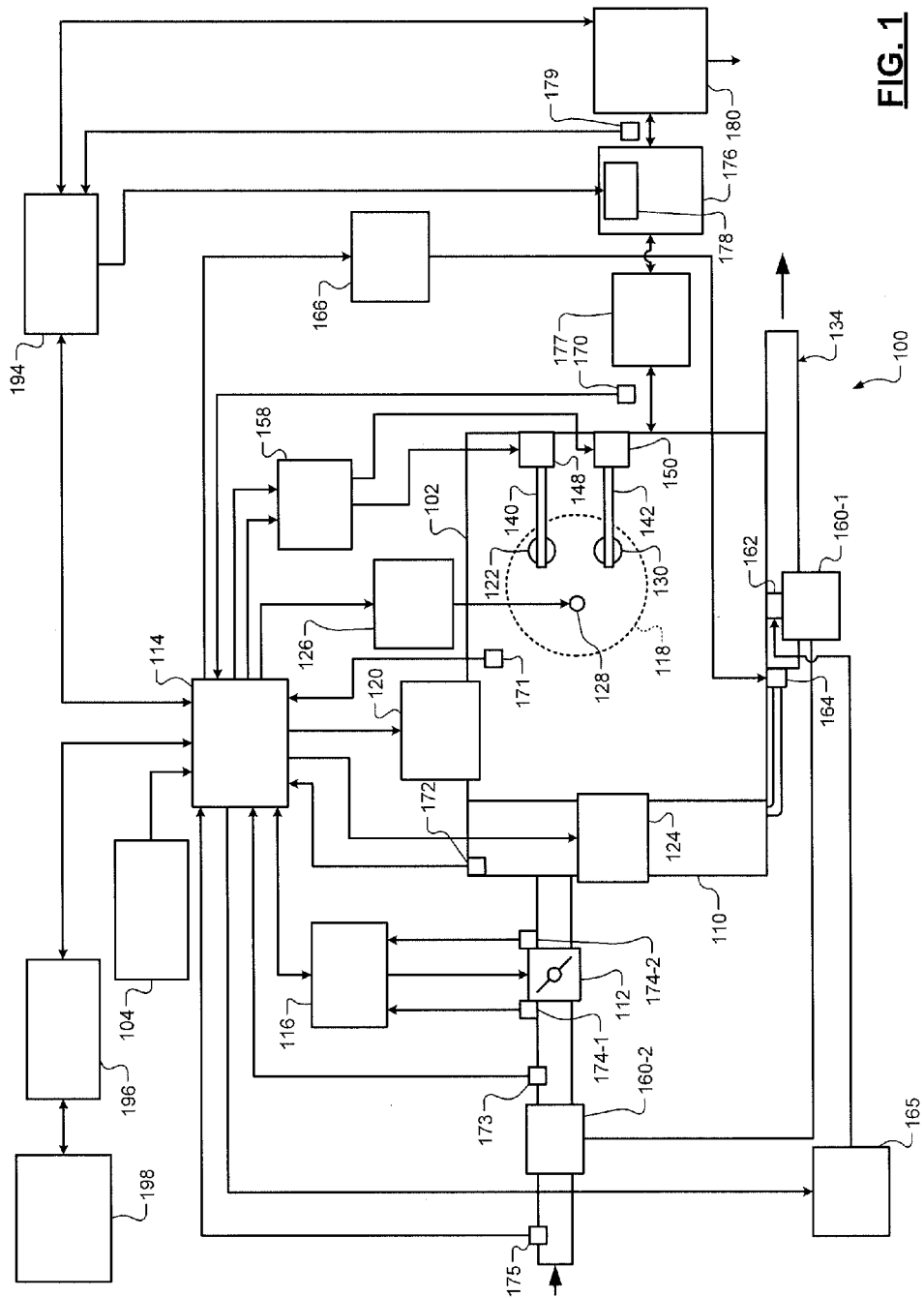
FIG. 1 is a functional block diagram of an example engine system.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As previously described, an engine control system may control an engine to achieve a desired torque. Specifically, the engine control system may control the engine based on an engine torque request. The engine torque request may be based on input from a driver of a vehicle, vehicle speed, and/or other operating parameters. The engine torque request may be based further on desired engine speed. Engine speed refers to a rotational speed of a crankshaft of the engine and may be measured in revolutions per minute (RPM). Therefore, the desired engine speed may also be referred to as desired RPM, or DRPM.

Controlling engine torque based on engine speed feedback, however, may cause disturbances in vehicle drivability. More specifically, the engine speed may change rapidly and therefore the engine speed feedback may have oscillations that propagate through the engine control system. The engine speed fluctuations may cause the engine control system to generate an engine torque request outside of a desired range. This engine speed based engine torque request, therefore, may also be referred to as an unsecured engine torque request. In other words, the engine torque request is not prevented from deviating from the desired range. Engine torque requests outside of the desired range may cause disturbances which decrease vehicle drivability.

Accordingly, a system and method are presented for securing engine torque requests. More specifically, the system and method are directed to generating a secured engine torque request for controlling an engine, thereby improving vehicle drivability and/or decreasing calibration costs. The system and method may first determine an engine torque request based on (i) an engine power request and (ii) DRPM. The system and method may determine the DRPM based on the engine power request, turbine speed, and/or torque converter clutch (TCC) slip. The system and method may implement a feed-forward controller to determine the engine torque request based on (i) the engine power request and (ii) the DRPM. The system and method may determine the engine power request based on (i) driver input and (ii) vehicle speed.

The system and method may determine a secured torque based on (i) the DRPM and (ii) a measured RPM. The system and method may determine first and second torque boundaries based on (i) the secured torque, (ii) driver input, and (iii) vehicle speed. The system and method may determine first and second torque values based on (i) an engine torque response model and (ii) the first and second torque boundaries. The engine torque response model may include at least one of (i) a time delay and (ii) a rate limit. The system and method may generate the secured engine torque request based on (i) the engine torque request and (ii) the first and second torque values. More specifically, the system and method may limit the engine torque request to a value between the first and second torque values. The system and method may then control the engine based on the secured engine torque request.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 165. The boost actuator module 165 may modulate the boost of the turbocharger by controlling the position of the wastegate 162. In various implementations, multiple turbochargers may be controlled by the boost actuator module 165. The turbocharger may have variable geometry, which may be controlled by the boost actuator module 165.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 164, which selectively redirects exhaust gas back to the intake manifold 110. The EGR valve 164 may be located upstream of the turbocharger's turbine 160-1. An EGR actuator module 166 may control the EGR valve 164 based on signals from the ECM 114.

The engine system 100 may measure the speed of the crankshaft in revolutions per minute (RPM) using an RPM sensor 170. The temperature of the engine coolant may be measured using an engine coolant temperature (ECT) sensor 171. The ECT sensor 171 may be located within the engine 102 or at other locations where the coolant is circulated, such as a radiator (not shown).

The pressure within the intake manifold 110 may be measured using a manifold absolute pressure (MAP) sensor 172. In various implementations, engine vacuum, which is the difference between ambient air pressure and the pressure within the intake manifold 110, may be measured. The mass flow rate of air flowing into the intake manifold 110 may be measured using a mass air flow (MAF) sensor 173. In various implementations, the MAF sensor 173 may be located in a housing that also includes the throttle valve 112.

The throttle actuator module 116 may monitor the position of the throttle valve 112 using one or more throttle position sensors (TPS) 174. For example, first and second throttle position sensors 174-1 and 174-2 monitor the position of the throttle valve 112 and generate first and second throttle positions (TPS1 and TPS2), respectively, based on the throttle position. The ambient temperature of air being drawn into the engine 102 may be measured using an intake air temperature (IAT) sensor 175. The ECM 114 may use signals from the sensors and/or one or more other sensors to make control decisions for the engine system 100.

The engine 102 outputs torque to a torque converter 176 via a flywheel 177, such as a dual mass flywheel (DMF). The torque converter 176 includes a torque converter clutch 178, a turbine (not shown), and an impeller (not shown). The turbine drives rotation of a transmission input shaft (not shown). Rotational speed of the turbine (turbine speed) may be measured using a turbine speed sensor 179. For example only, the turbine speed may be measured based on the rotational speed of the transmission input shaft or another suitable parameter indicative of the rotational speed of the turbine of the torque converter 176. Based on a gear ratio selected within a transmission 180, torque is transferred between the transmission input shaft and a transmission output shaft (not shown). Torque may be transferred to wheels of the vehicle via the transmission output shaft.

A transmission control module 194 may control operation of the transmission 180 and the TCC 178. The ECM 114 may communicate with the transmission control module 194 for various reasons, such as to share parameters, and to coordinate engine operation with shifting gears in the transmission 180 and/or operation of the TCC 178. For example, the ECM 114 may selectively reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 165, and the EGR actuator module 166. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
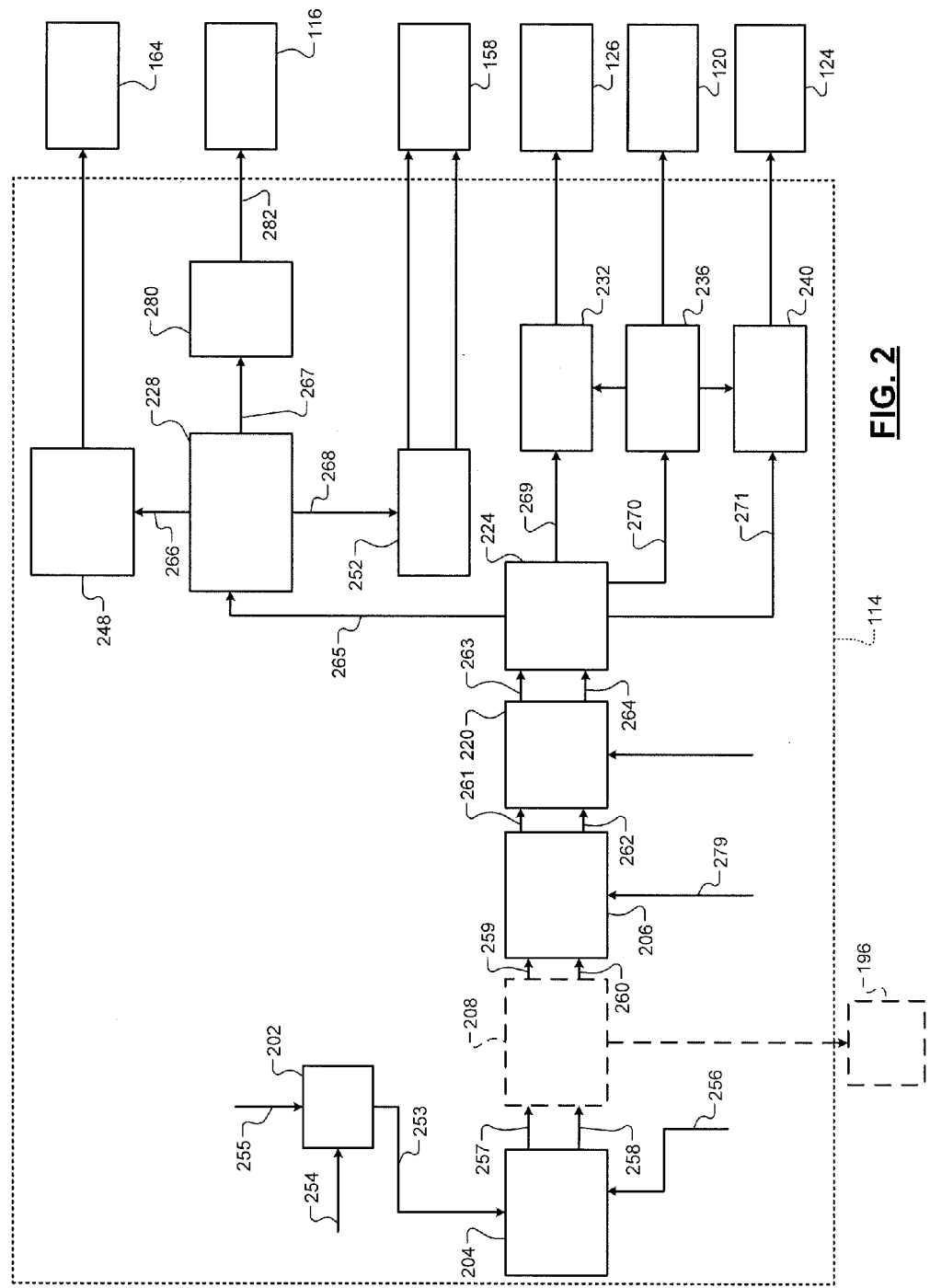
FIG. 2 is a functional block diagram of an example engine control module (ECM)

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The example implementation of the ECM 114 also includes a reserves/loads module 220, an actuation module 224, an air control module 228, a spark control module 232, a cylinder control module 236, and a fuel control module 240. The example implementation of the ECM 114 also includes a boost scheduling module 248 and a phaser scheduling module 252.

The driver torque module 202 (see also FIG. 3 and the corresponding description below) may determine a secured engine torque request 253 based on a driver input 254 from the driver input module 104. The driver input 254 may be based on, for example, a position of an accelerator pedal and a position of a brake pedal. The driver input 254 may also be based on cruise control, which may be an adaptive cruise control system that varies vehicle speed to maintain a predetermined following distance. The driver torque module 202 may determine the secured engine torque request 253 further based on a vehicle speed 255. For example only, the vehicle speed 255 may be generated based on one or more measured wheel speeds, a transmission output shaft speed, and/or one or more other suitable parameters.

An axle torque arbitration module 204 arbitrates between the secured engine torque request 253 and other axle torque requests 256. Axle torque (torque at the wheels) may be produced by various sources including an engine and/or an electric motor. Generally, torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

The axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 253 and 256. As described below, the predicted and immediate torque requests 257 and 258 from the axle torque arbitration module 204 may selectively be adjusted by other modules of the ECM 114 before being used to control actuators of the engine system 100.

In general terms, the immediate torque request 258 is the amount of currently desired axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the actuator values to allow a faster transition to the predicted torque request 257, while still maintaining the axle torque at the immediate torque request 258.

In various implementations, the predicted torque request 257 may be based on the secured engine torque request 253. The immediate torque request 258 may be less than the predicted torque request 257, such as when the secured engine torque request 253 is causing wheel slip on an icy surface. In such a case, a traction control system (not shown) may request a reduction via the immediate torque request 258, and the ECM 114 reduces the torque produced by the engine system 100 to the immediate torque request 258. However, the ECM 114 controls the engine system 100 so that the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request 257, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request 258 is within the range, fast engine actuators can be set to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set actuator values for fast actuators to values that, given the slow actuator values, cause the engine system 100 to produce the immediate torque request 258 instead of the predicted torque request 257.

The fast actuator values therefore cause the engine system 100 to produce the immediate torque request 258. When the ECM 114 decides to transition the axle torque from the immediate torque request 258 to the predicted torque request 257, the ECM 114 changes the actuator values for one or more fast actuators to values that correspond to the predicted torque request 257. Because the slow actuator values have already been set based on the predicted torque request 257, the engine system 100 is able to produce the predicted torque request 257 after only the delay imposed by the fast actuators. In other words, the longer delay that would otherwise result from changing axle torque using slow actuators is avoided.

For example only, when the predicted torque request 257 is equal to the secured engine torque request 253, a torque reserve may be created when the immediate torque request 258 is less than the secured engine torque request 253 due to a temporary torque reduction request. Alternatively, a torque reserve may be created by increasing the predicted torque request 257 above the secured engine torque request 253 while maintaining the immediate torque request 258 at the secured engine torque request 253. The resulting torque reserve can absorb sudden increases in required axle torque. For example only, sudden loads imposed by an air conditioner or a power steering pump may be counteracted by increasing the immediate torque request 258. If the increase in the immediate torque request 258 is less than the torque reserve, the increase can be quickly produced by using fast actuators. The predicted torque request 257 may also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request 258 while maintaining the values of the slow actuators. For example, to maintain a given idle speed, the immediate torque request 258 may vary within a range. If the predicted torque request 257 is set to a level above this range, variations in the immediate torque request 258 that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, a maximum amount of torque may be produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle opening area are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce the predicted torque request 257. Meanwhile, the spark timing can be set based on the immediate torque request 258, which is less than the predicted torque request 257. Although the throttle opening area generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark advance to a calibrated value, which allows the engine 102 to produce the full engine output torque achievable with the air flow already present. The engine output torque may therefore be quickly increased to the predicted torque request 257 without experiencing delays from changing the throttle opening area.

When the engine 102 is a compression-ignition engine, the fuel actuator module 124 may be a fast actuator and the throttle actuator module 116 and the boost actuator module 165 may be emissions actuators. The fuel mass may be set based on the immediate torque request 258, and the throttle opening area, boost, and EGR opening may be set based on the predicted torque request 257. The throttle opening area may generate more air flow than necessary to satisfy the predicted torque request 257. In turn, the air flow generated may be more than required for complete combustion of the injected fuel such that the air/fuel ratio is usually lean and changes in air flow do not affect the engine output torque. The engine output torque will therefore be equal to the immediate torque request 258 and may be increased or decreased by adjusting the fuel flow.

The throttle actuator module 116, the boost actuator module 165, and the EGR valve 164 may be controlled based on the predicted torque request 257 to control emissions and to minimize turbo lag. The throttle actuator module 116 may create a vacuum within the intake manifold 110 to draw exhaust gases through the EGR valve 164 and into the intake manifold 110.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 279, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests 261 and 262 may be generated by modifying one of the received requests based on another one or more of the received torque requests.

The propulsion torque requests 279 may include torque reductions for engine over-speed protection, torque increases for stall prevention, and torque reductions requested by the transmission control module 194 to accommodate gear shifts. The propulsion torque requests 279 may also result from clutch fuel cutoff, which reduces the engine output torque when the driver depresses the clutch pedal in a manual transmission vehicle to prevent a flare (rapid rise) in engine speed.

The propulsion torque requests 279 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the actuation module 224.

For example only, a catalyst light-off process or a cold start emissions reduction process may require retarded spark advance. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (A/C) compressor clutch. The reserve for engagement of the A/C compressor clutch may be created when the driver first requests air conditioning. The reserves/loads module 220 may increase the adjusted predicted torque request 263 while leaving the adjusted immediate torque request 264 unchanged to produce the torque reserve. Then, when the A/C compressor clutch engages, the reserves/loads module 220 may increase the adjusted immediate torque request 264 by the estimated load of the A/C compressor clutch.

The actuation module 224 receives the adjusted predicted and immediate torque requests 263 and 264. The actuation module 224 determines how the adjusted predicted and immediate torque requests 263 and 264 will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control, but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request 265 based on the adjusted predicted torque request 263. The air torque request 265 may be equal to the adjusted predicted torque request 263, setting air flow so that the adjusted predicted torque request 263 can be achieved by changes to other actuators.

The air control module 228 may determine desired actuator values based on the air torque request 265. For example only, the air control module 228 may determine a desired manifold absolute pressure (MAP) 266, a desired throttle position 267, and/or a desired air per cylinder (APC) 268 based on the air torque request 265. The desired MAP 266 may be used to determine a desired boost, and the desired APC 268 may be used to determine desired cam phaser positions and the desired throttle position 267. In various implementations, the air control module 228 may also determine an amount of opening of the EGR valve 164 based on the air torque request 265.

The actuation module 224 may also generate a spark torque request 269, a cylinder shut-off torque request 270, and a fuel torque request 271. The spark torque request 269 may be used by the spark control module 232 to determine how much to retard the spark timing (which reduces engine output torque) from a calibrated spark timing.

The cylinder shut-off torque request 270 may be used by the cylinder control module 236 to determine how many cylinders to deactivate. The cylinder control module 236 may instruct the cylinder actuator module 120 to deactivate one or more cylinders of the engine 102. In various implementations, a predefined group of cylinders (e.g., half) may be deactivated jointly.

The cylinder control module 236 may also instruct the fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel control module 240 may vary the amount of fuel provided to each cylinder based on the fuel torque request 271. During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a fuel mass that will yield stoichiometric combustion when combined with the current amount of air per cylinder. The fuel control module 240 may instruct the fuel actuator module 124 via a fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request 271 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

The air control module 228 may output the desired throttle position 267 to a throttle control module 280. The air control module 228 may determine the desired throttle position 267 based on the air torque request 265. The throttle control module 280 generates a desired pulse width modulation (PWM) signal 282 using closed-loop control based on the desired throttle position 267. The throttle actuator module 116 actuates the throttle valve 112 based on the desired PWM signal 282. More specifically, the desired PWM signal 282 may drive (e.g., a motor of) the throttle actuator module 116 to actuate the throttle valve 112. While the desired PWM signal 282 is shown and discussed, the throttle control module 280 may control the throttle actuator module 116 using another suitable type of signal.

The air control module 228 may output the desired MAP 266 to the boost scheduling module 248. The boost scheduling module 248 uses the desired MAP 266 to control the boost actuator module 165. The boost actuator module 165 then controls one or more turbochargers (e.g., the turbocharger including the turbine 160-1 and the compressor 160-2) and/or superchargers.

The air control module 228 outputs the desired APC 268 to the phaser scheduling module 252. Based on the desired APC 268 and the RPM signal, the phaser scheduling module 252 may control positions of the intake and/or exhaust cam phasers 148 and 150 using the phaser actuator module 158.

Referring back to the spark control module 232, the calibrated spark timing may vary based on various engine operating conditions. For example only, a torque relationship may be inverted to solve for desired spark advance. For a given torque request ($T_{des}$), the desired spark advance ($S_{des}$) may be determined based on $$S_{des}=T^{-1}(T_{des},APC,I,E,AF,OT,\#). \qquad (1)$$

This relationship may be embodied as an equation and/or as a lookup table. The air/fuel ratio (AF) may be the actual air/fuel ratio, as reported by the fuel control module 240.

When the spark advance is set to the calibrated spark timing, the resulting torque may be as close to a maximum best torque (MBT) as possible. MBT refers to the maximum engine output torque that is generated for a given air flow as spark advance is increased, while using fuel having an octane rating greater than a predetermined octane rating and using stoichiometric fueling. The spark advance at which this maximum torque occurs is referred to as an MBT spark timing. The calibrated spark timing may differ slightly from MBT spark timing because of, for example, fuel quality (such as when lower octane fuel is used) and environmental factors. The engine output torque at the calibrated spark timing may therefore be less than MBT.

Figure 3:
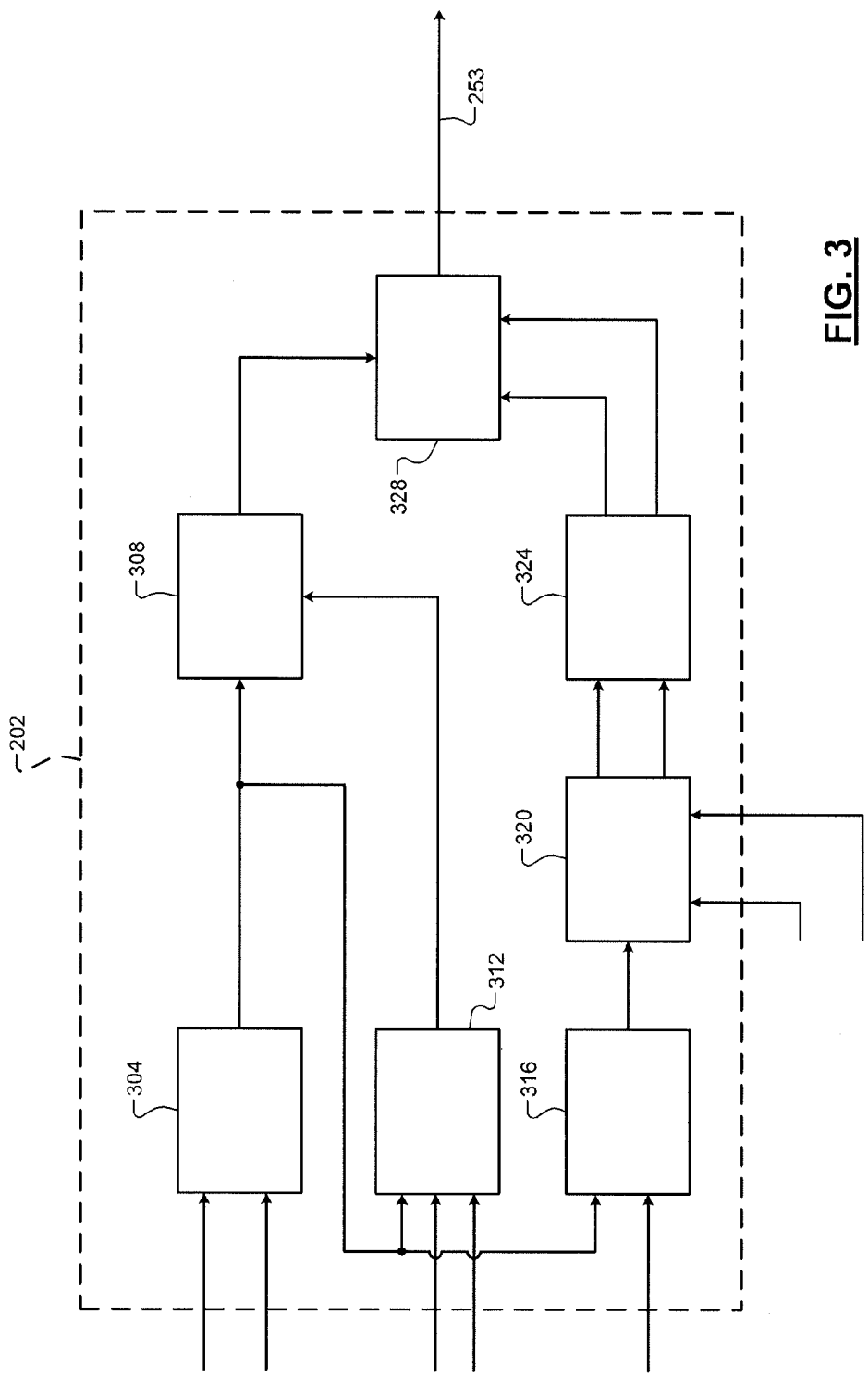
FIG. 3 is a functional block diagram of an example driver torque module.

Referring now to FIG. 3, an example of the driver torque module 202 is shown. The driver torque module 202 may include a driver interpretation module 304, an engine torque request module 308, a DRPM determination module 312, a secured torque determination module 316, a torque boundary determination module 320, an engine torque response module 324, and a torque command limit module 328.

The driver interpretation module 304 generates an engine power request ($P_E$) based on the driver input 254 and the vehicle speed 255. As stated above, the driver input 254 may include an accelerator pedal position and/or one or more other suitable parameters, such as a brake pedal position and cruise control inputs. The vehicle speed 255 may be generated based on, for example, one or more wheel speeds, the transmission output shaft speed, and/or one or more other parameters. The driver interpretation module 304 may generate the engine power request $P_E$ using a function and/or a mapping that relates the accelerator pedal position and the vehicle speed 255 to the engine power request $P_E$. The function and/or mapping may be calibrated such that the vehicle achieves a desired acceleration for the vehicle speed 255 and the accelerator pedal position.

The engine torque request module 308 generates an engine torque request ($T_E$) based on the engine power request $P_E$. The engine torque request module 308 generates the engine torque request $T_E$ further based on the DRPM. The DRPM may be determined for purposes of the determining the engine torque request $T_E$. The DRPM determination module 312 determines the DRPM. The DRPM determination module 312 determines the DRPM based on the engine power request $P_E$, turbine speed (TS), and slip. For example, the slip may be torque converter clutch (TCC) slip. The DRPM determination module 312 may also generate the DRPM based on other operating parameters such as those described in commonly-assigned U.S. patent application Ser. No. 13/166,232, filed on Jun. 22, 2011, which was herein incorporated by reference in its entirety.

The engine torque request module 312 generates the engine torque request $T_E$ by converting the engine power request $P_E$ into a torque using the DRPM. More specifically, the engine torque request module 312 may generate the engine torque request $T_E$ as follows:

$$T_E = \frac{P_E}{DRPM}. \quad (2)$$

The engine torque request module 38, however, generates the engine torque request $T_E$ using feed-forward (FF) control to decrease the period between when a change in the engine torque request $T_E$ is made and when the engine 102 outputs torque corresponding to the engine torque request $T_E$. For example only, the feed-forward control may include a first-order correction. Additionally, for example only, the engine torque request module 308 may determine the engine torque request $T_E$ as follows:

$$ETR_k = \frac{FFP_k}{DRPM_k}, \quad (3)$$

where $ETR_k$ is the engine torque request $T_E$ at a given time k, $DRPM_k$ is the DRPM at the given time k, and $FFP_k$ is a feed-forward power determined for the given time k as follows:

$$FFP_k = a(ETR_k - ETR_{k-1}) + FFP_{k-1} + b(ETR_{k-1} - FFP_{k-1}), \quad (4)$$

where $ETR_k$ is the engine power request $P_E$ at the given time k, $EPR_{k-1}$ is the engine power request $P_E$ at a previous time k−1, $FFP_{k-1}$ is value of FFP at the previous time k−1, and a and b are predetermined values calibrated to cause the engine 102 to achieve the engine power request $P_E$ and the engine torque request $T_E$ earlier than if equation (3) above was used to generate the engine torque request $T_E$. The time k may be the time for a present control loop, and the previous time k−1 may be the time for a previous control loop.

The secured torque determination module 316 determines a secured torque ($T_S$). The secured torque determination module 316 may determine the secured torque $T_S$ based on the engine power request $P_E$. The secured torque determination module 316 may determine the secured torque $T_S$ further based on engine speed (RPM). The engine speed RPM may be measured by the engine speed sensor 170. More specifically, the secured torque determination module 316 may determine the secured torque $T_S$ as follows:

$$T_S = \frac{P_E}{RPM}. \quad (5)$$

The torque boundary determination module 320 determines torque boundaries ($T_{MAX}$, $T_{MIN}$). The torque boundary determination module 320 may determine the torque boundaries $T_{MAX}$, $T_{MIN}$ based on the secured torque $T_S$. The torque boundary determination module 320 may determine the torque boundaries $T_{MAX}$, $T_{MIN}$ further based on driver input 254 and vehicle speed 255. More specifically, the torque boundary determination module 320 may determine the torque boundaries $T_{MAX}$, $T_{MIN}$ by determining a variation from the secured torque $T_S$. For example, the variation may be determined as a function of the driver input 254 and the vehicle speed 255.

The engine torque response module 324 determines maximum and minimum torque values (Max, Min). The maximum and minimum torque values Max, Min represent maximum and minimum acceptable torque values for preventing disturbances in vehicle drivability. The engine torque response module 324 may determine the maximum and minimum torque values Max, Min using an engine torque response model. For example, the engine torque response model may be applied individually to the torque boundaries $T_{MAX}$ and $T_{MIN}$ to generate the maximum and minimum torque values Max and Min, respectively. The engine torque response model may further apply time delay(s) and/or rate limits to the maximum torque value Max and/or the minimum torque value Min.

The torque command limit module 328 generates the secured engine torque request 253. The torque command limit module 328 may generate the secured engine torque request 253 based on the engine torque request $T_E$. The torque command limit module 328 may generate the secured engine torque request 253 further based on the maximum and minimum torque values Max, Min. The torque command limit module 328 may limit the engine torque request $T_E$ to the maximum and minimum torque values Max, Min. More specifically, the torque command limit module may generate the secured engine torque request 253 as follows:

$$Min \leq T_{ES} \leq Max, \quad (6)$$

where $T_{ES}$ represents the secured engine torque request 253 limited (or constrained) by the maximum and minimum torque values Max, Min.

Figure 4:
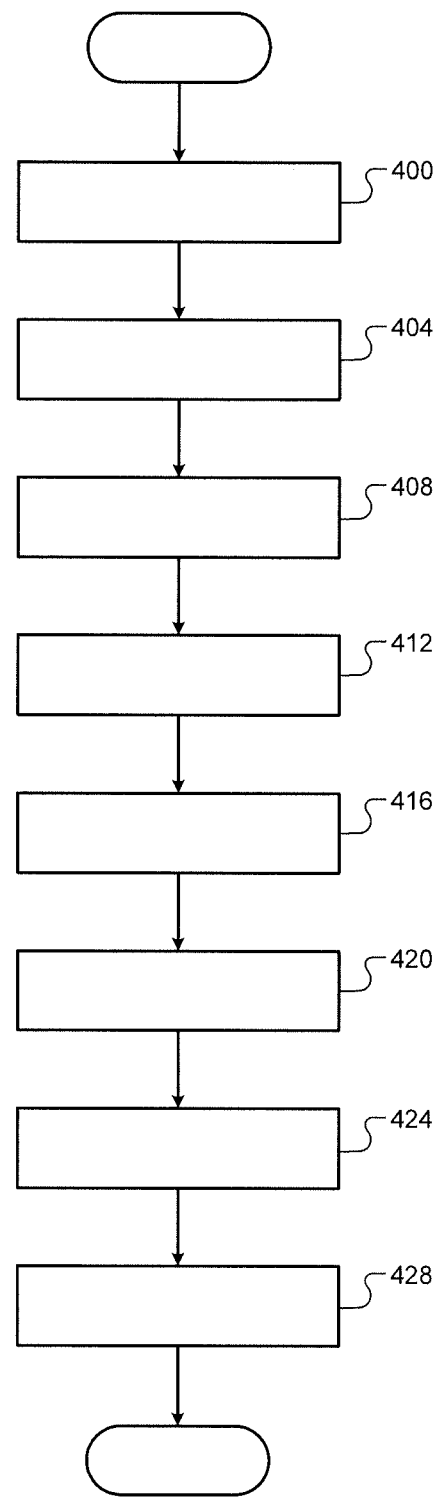
FIG. 4 is a flow diagram illustrating an example method for securing engine torque requests.

Referring now to FIG. 4, an example method for improved vehicle drivability for engine torque control based on desired engine speed begins at 400. At 400, the ECM 114 determines an engine power request $P_E$ based on driver input 254 and vehicle speed 255. At 404, the ECM 114 determines DRPM based on the engine power request $P_E$, turbine speed TS, and TCC slip. At 408, the ECM 114 determines an engine torque request $T_E$ based on the engine power request $P_E$ and the DRPM. At 412, the ECM 114 determines a secured torque $T_S$ based on the engine power request and engine speed RPM.

At 416, the ECM 114 determines torque boundaries $T_{MAX}$, $T_{MIN}$ based on the secured torque $T_S$, driver input 254, and vehicle speed 255. At 420, the ECM 114 determines maximum and minimum torque values Max, Min based on the torque boundaries $T_{MAX}$, $T_{MIN}$ and an engine torque response model. At 424, the ECM 114 generates a secured engine torque request based on the engine torque request $T_E$ and the maximum and minimum torque values Max, Min. At 428, the ECM 114 controls the engine 102 based on the secured engine torque request. Control may then end or loop back to 400 for another cycle.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, the control system comprising:
   an engine torque request module that determines an engine torque request based on (i) an engine power request and (ii) a desired engine speed (DRPM);
   an engine torque response module that determines first and second torque values based on (i) an engine torque response model and (ii) first and second torque boundaries, wherein the first and second torque boundaries are based on the DRPM and a measured engine speed (RPM);
   a torque command limit module that generates a secured engine torque request based on (i) the engine torque request and (ii) the first and second torque values; and
   an actuation module that controls at least one actuator of the engine based on the secured engine torque request.

2. The control system of claim 1, further comprising a driver interpretation module that determines the engine power request based on (i) driver input and (ii) vehicle speed.

3. The control system of claim 2, further comprising a DRPM determination module that determines the DRPM based on (i) the engine power request, (ii) turbine speed, and (iii) torque converter clutch slip.

4. The control system of claim 3, wherein the engine torque request module includes a feed-forward controller that determines the engine torque request based on (i) the engine power request and (ii) the DRPM.

5. The control system of claim 3, further comprising a secured torque determination module that determines a secured torque based on (i) the DRPM and (ii) the RPM.

6. The control system of claim 5, further comprising a torque boundary determination module that determines the first and second torque boundaries based on (i) the secured torque, (ii) the driver input, and (iii) the vehicle speed.

7. The control system of claim 6, wherein the driver input includes at least one of (i) accelerator pedal position, (ii) brake pedal position, and (iii) a cruise control input.

8. The control system of claim 1, wherein the engine torque response model includes at least one of (i) a time delay and (ii) a rate limit.

9. The control system of claim 1, wherein the torque command limit module generates the secured engine torque request by limiting the engine torque request to a value between the first and second torque values.

10. The control system of claim 1, wherein controlling the at least one actuator of the engine includes controlling at least one of air, fuel, and spark provided to the engine.

11. A method for controlling an engine, the method comprising:
    determining an engine torque request based on (i) an engine power request and (ii) a desired engine speed (DRPM);
    determining first and second torque values based on (i) an engine torque response model and (ii) first and second torque boundaries, wherein the first and second torque boundaries are based on the DRPM and a measured engine speed (RPM);
    generating a secured engine torque request based on (i) the engine torque request and (ii) the first and second torque values; and
    controlling at least one actuator of the engine based on the secured engine torque request.

12. The method of claim 11, further comprising determining the engine power request based on (i) driver input and (ii) vehicle speed.

13. The method of claim 12, further comprising determining the DRPM based on (i) the engine power request, (ii) turbine speed, and (iii) torque converter clutch slip.

14. The method of claim 13, determining the engine torque request based on (i) the engine power request and (ii) the DRPM, using a feed-forward controller.

15. The method of claim 13, further comprising determining a secured torque based on (i) the DRPM and (ii) the RPM.

16. The method of claim 15, further comprising determining the first and second torque boundaries based on (i) the secured torque, (ii) the driver input, and (iii) the vehicle speed.

17. The method of claim 16, wherein the driver input includes at least one of (i) accelerator pedal position, (ii) brake pedal position, and (iii) a cruise control input.

18. The method of claim 11, wherein the engine torque response model includes at least one of (i) a time delay and (ii) a rate limit.

19. The method of claim 11, further comprising generating the secured engine torque request by limiting the engine torque request to a value between the first and second torque values.

20. The method of claim 11, wherein controlling the at least one actuator of the engine includes controlling at least one of air, fuel, and spark provided to the engine.

* * * * *